(12) United States Patent
Zhong

(10) Patent No.: US 11,203,371 B2
(45) Date of Patent: Dec. 21, 2021

(54) FOLDING DEVICE AND CHILD CARRIER THEREWITH

(71) Applicant: Wonderland Switzerland AG, Steinhausen (CH)

(72) Inventor: Zhi-Ren Zhong, Guangdong (CN)

(73) Assignee: Wonderland Switzerland AG, Steinhausen (CH)

( * ) Notice: Subject to any disclaimer, the term of this patent is extended or adjusted under 35 U.S.C. 154(b) by 231 days.

(21) Appl. No.: 16/664,955

(22) Filed: Oct. 28, 2019

(65) Prior Publication Data

US 2020/0172143 A1 Jun. 4, 2020

(30) Foreign Application Priority Data

Oct. 30, 2018 (CN) .......................... 201821779091.3

(51) Int. Cl.
*B62B 7/08* (2006.01)
*B62B 7/06* (2006.01)

(52) U.S. Cl.
CPC .............. *B62B 7/068* (2013.01); *B62B 7/062* (2013.01); *B62B 7/08* (2013.01); *B62B 2202/42* (2013.01); *B62B 2205/06* (2013.01)

(58) Field of Classification Search
CPC ........... B62B 7/068; B62B 7/062; B62B 7/08; B62B 2202/42; B62B 2205/06
See application file for complete search history.

(56) References Cited

U.S. PATENT DOCUMENTS

| 5,553,885 A * | 9/1996 | Chang ....................... B62B 7/08 280/642 |
| 7,789,402 B2 * | 9/2010 | Saville ..................... B62B 7/145 280/47.38 |
| 9,610,966 B2 * | 4/2017 | Zhong .................. A47D 11/005 |
| 2013/0113185 A1 * | 5/2013 | Zehfuss ................. B62B 9/102 280/647 |
| 2013/0113188 A1 * | 5/2013 | Liao .......................... B62B 7/08 280/650 |

FOREIGN PATENT DOCUMENTS

| CN | 104670289 A | 6/2015 |
| WO | 2017/005516 A1 | 1/2017 |

\* cited by examiner

*Primary Examiner* — Bryan A Evans
(74) *Attorney, Agent, or Firm* — Winston Hsu

(57) ABSTRACT

The present invention discloses a folding device and a child carrier therewith. The folding device is installed between a frame and a seat of the child carrier and includes a sliding structure, a mounting base and a linking component. The sliding structure is fixedly disposed on or inside a handle of the frame. The mounting base is slidably disposed on the sliding structure for detachably engaging with the seat. A first end of the linking component is pivotally connected to the mounting base. A second end of the linking component is pivotally connected to a rear leg of the frame. The linking component is driven to drive the mounting base to slide relative to the sliding structure when the handle pivots relative to the rear leg. The folding device and the child carrier have advantages of easy operation, simple structure and compact folding of the frame.

22 Claims, 10 Drawing Sheets

FOLDING DEVICE AND CHILD CARRIER THEREWITH

BACKGROUND OF THE INVENTION

1. Field of the Invention

The present invention relates to a child product, and more particularly, to a folding device with simple structure and easy operation and capacity for allowing compact folding of a frame, and a child carrier therewith.

2. Description of the Prior Art

With progress of society, development of economy and advancement of technology, there are more and more consumer products for improving people's lives. For example, a child carrier, such as a stroller, is one of the consumer products. It is a common way for parents to use a child carrier with wheels to carry a child instead of holding the child by hands when hanging around or traveling. The child carrier can not only reduce a burden of the parents but also provide a comfortable and safe sitting environment for the child. Therefore, the child carrier becomes more and more popular.

The conventional child carrier includes a frame and a seat mounted on the frame and for allowing a child to sit therein. However, the seat is usually not detachable or foldable. Furthermore, although some of the conventional child carriers are foldable in order for easy storage or transportation, folding mechanisms of such conventional foldable child carriers have complex structure and are difficult to use, and the conventional folded child carriers still occupy large space, which is not convenient in use.

Therefore, there is a need to provide a folding device with simple structure and easy operation and capacity for allowing compact folding of a frame, and a child carrier therewith.

SUMMARY OF THE INVENTION

It is an objective of the present invention to provide a folding device with simple structure and easy operation and capacity for allowing compact folding of a frame, and a child carrier therewith.

In order to achieve the aforementioned objective, the present invention discloses a folding device installed between a frame and a seat of a child carrier. The folding device includes a sliding structure, a mounting base and a linking component. The sliding structure is fixedly disposed on or inside a handle of the frame. The mounting base is slidably disposed on the sliding structure for detachably engaging with the seat. A first end of the linking component is pivotally connected to the mounting base. A second end of the linking component is pivotally connected to a rear leg of the frame. The linking component is driven to drive the mounting base to slide relative to the sliding structure when the handle pivots relative to the rear leg.

Preferably, in an embodiment of the present invention, the sliding structure is arranged along a longitudinal direction of the handle, and the mounting base is slidable along the longitudinal direction of the handle.

Preferably, in an embodiment of the present invention, the mounting base includes a sliding portion, a mounting portion and a pivoting portion. The sliding portion is located between the mounting portion and the pivoting portion. The sliding portion is slidably connected to the sliding structure. The mounting portion is detachably for engaging with the seat, and the pivoting portion is pivotally connected to the linking component.

Preferably, in an embodiment of the present invention, the mounting base is formed in an L shape and includes an upper end part, a lower end part and a corner part. The sliding portion is located at the corner part, and the mounting portion and the pivoting portion are respectively located on the upper end part and the lower end part.

Preferably, in an embodiment of the present invention, at least one first engaging portion is formed on the sliding structure, and at least one second engaging portion is formed on the sliding portion and for slidably engaging with the at least one first engaging portion.

Preferably, in an embodiment of the present invention, two first engaging portions are respectively formed on two sides of the sliding structure and symmetrical to each other, and two second engaging portions are respectively formed on two sides of the sliding portion and respectively corresponding to the two first engaging portions for respectively slidably engaging with the two first engaging portions.

Preferably, in an embodiment of the present invention, a mounting slot is formed on a side of the mounting portion away from the sliding portion for accommodating a counter mounting portion of the seat. A shape of the mounting slot matches with a shape of the counter mounting portion, and a positioning protrusion is formed on the mounting slot and for positioning the counter mounting portion of the seat when the counter mounting portion is accommodated in the mounting slot.

Preferably, in an embodiment of the present invention, the pivoting portion is disposed on a side of a lower end part of the mounting base facing toward the rear leg.

Preferably, in an embodiment of the present invention, the linking component includes a first segment, a second segment and a third segment. The second segment is located between and connected to the first segment and the third segment. The first segment and the third segment are bent from the second segment and toward two opposite directions.

Preferably, in an embodiment of the present invention, the folding device further includes a first fixing component and a second fixing component for seamlessly matching with the first fixing component, and the first fixing component and the second fixing component are located between the handle and the front leg.

Preferably, in an embodiment of the present invention, the sliding structure is fixedly disposed on the first fixing component or extends from an upper end of the first fixing component and toward an upper end of the handle.

Preferably, in an embodiment of the present invention, the folding device further includes a locking mechanism disposed between the handle and the front leg and for allowing or restraining pivotal movement of the handle relative to the front leg.

Preferably, in an embodiment of the present invention, the locking mechanism includes an operating component, a driving component, a locking component and an engaging component. The operating component is movably disposed outside the handle. The driving component is disposed inside the handle. An upper end of the driving component is connected to the operating component. The locking component is disposed inside the handle and movably connected to a lower end of the driving component. The engaging component is partially disposed inside the front leg and partially located between the first fixing component and the second fixing component. The operating component drives the driving component to drive the locking component to engage with or disengage from the engaging component when the operating component is operated.

Preferably, in an embodiment of the present invention, an engaging notch is formed on one of the locking component and the engaging component, and an engaging protrusion is formed on another one of the locking component and the engaging component.

Preferably, in an embodiment of the present invention, an inserting slot is formed on the lower end of the driving component. Two long holes are formed on two sides of the lower end of the driving component and communicated with the inserting slot. A through hole is formed on an upper end of the locking component, and the upper end of the locking component is inserted into the inserting slot and movably connected to the driving component by a pin passing through the two long holes and the through hole.

Preferably, in an embodiment of the present invention, the locking mechanism further includes a resilient component disposed between the locking component and the pin for biasing the locking component to engage with the engaging component.

Preferably, in an embodiment of the present invention, an accommodating slot is formed on the first fixing component. A first end of the engaging component is disposed inside the second fixing component, and a second end of the engaging component is at least partially disposed inside the accommodating slot and detachable from the accommodating slot.

Preferably, in an embodiment of the present invention, the engaging component includes a protruding portion formed in an arc shape, and the protruding portion is detached from the accommodating slot when the handle pivots relative to the front leg.

In order to achieve the aforementioned objective, the present invention further discloses a child carrier. The child carrier includes a frame, a seat and a folding device. The frame includes a handle and a rear leg pivoted to the handle. The folding device is installed between the seat and the frame and for detachably mounting the seat on the frame. The folding device includes a sliding structure, a mounting base and a linking component. The sliding structure is fixedly disposed on or inside the handle. The mounting base is slidably disposed on the sliding structure for detachably engaging with the seat. A first end of the linking component is pivotally connected the mounting base. A second end of the linking component is pivotally connected to the rear leg. The linking component is driven to drive the mounting base to slide relative to the sliding structure when the handle pivots relative to the rear leg.

Preferably, in an embodiment of the present invention, the child carrier further includes a pedal and a connecting component. The front leg includes two front tubes. The pedal is disposed between the two front tubes, and the connecting component is detachably connected to the pedal for connecting a basket.

Preferably, in an embodiment of the present invention, the child carrier further includes at least one fastener disposed on the pedal and for detachably connecting the connecting component. The connecting component includes a connecting end formed in a tube shape, and a cross-sectional shape of the at least one fastener matches with a cross-sectional shape of the connecting end.

Preferably, in an embodiment of the present invention, the child carrier further includes a plurality of fasteners disposed on the pedal and arranged along the pedal at intervals for detachably connecting the connecting component. The connecting component includes a connecting end formed in a tube shape, and a cross-sectional shape of each of the plurality of fasteners matches with a cross-sectional shape of the connecting end.

In summary, the preset invention utilizes the folding device installed between the seat and the frame to drive the seat to slide relative to the frame during a folding action or an unfolding action of the frame, which makes structure of the folded child carrier compact to effectively reduce an occupied space of the folded child carrier for easy storage or transportation. Furthermore, the folding device and the child carrier of the present invention have advantages of simple structure and easy operation to provide a comfortable and safe sitting environment for a child.

These and other objectives of the present invention will no doubt become obvious to those of ordinary skill in the art after reading the following detailed description of the preferred embodiment that is illustrated in the various figures and drawings.

DETAILED DESCRIPTION

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. Accordingly, the drawings and descriptions will be regarded as illustrative in nature and not as restrictive.

Figure 1:
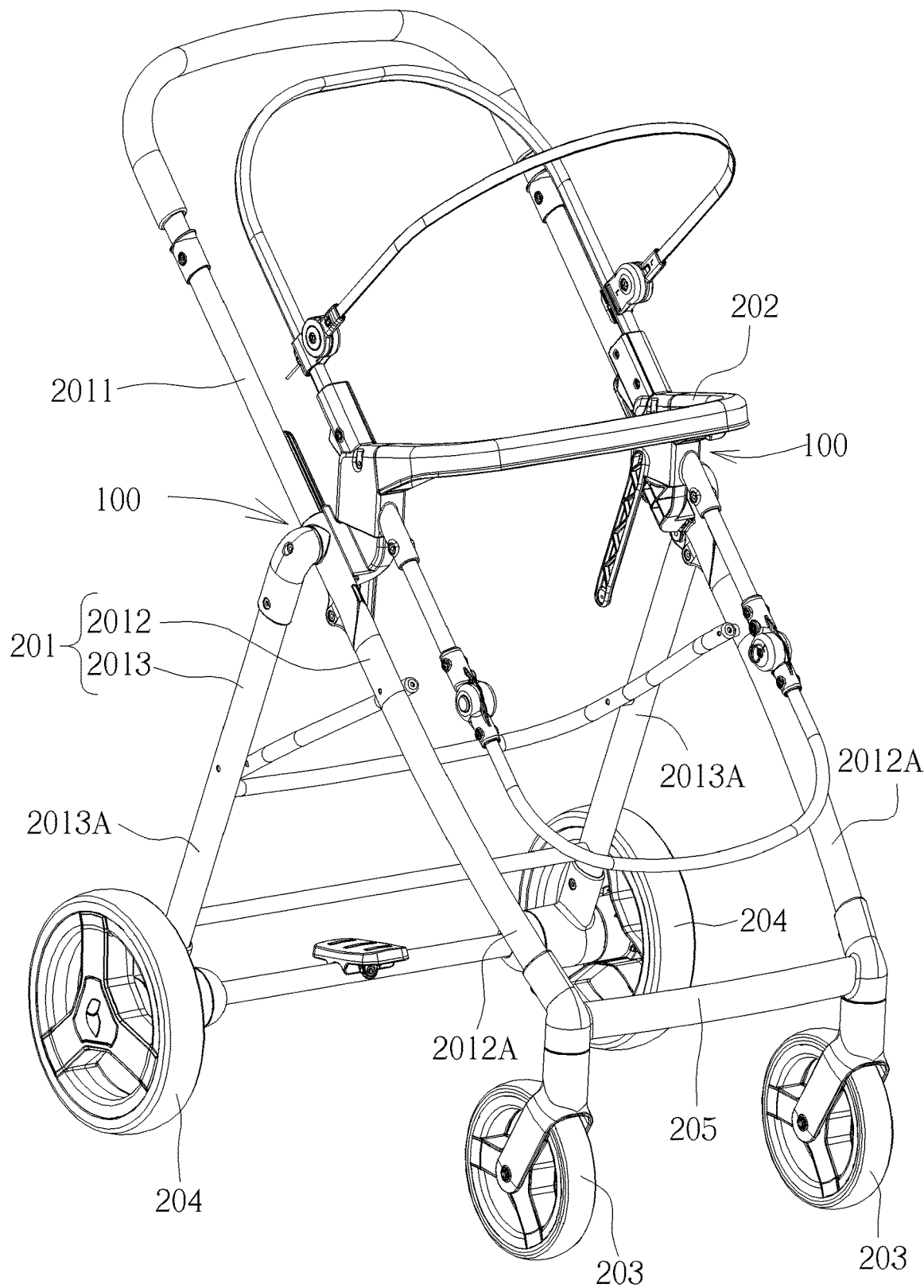
FIG. 1 and FIG. 2 are schematic diagrams of a child carrier at different views according to an embodiment of the present invention.
Figure 2:
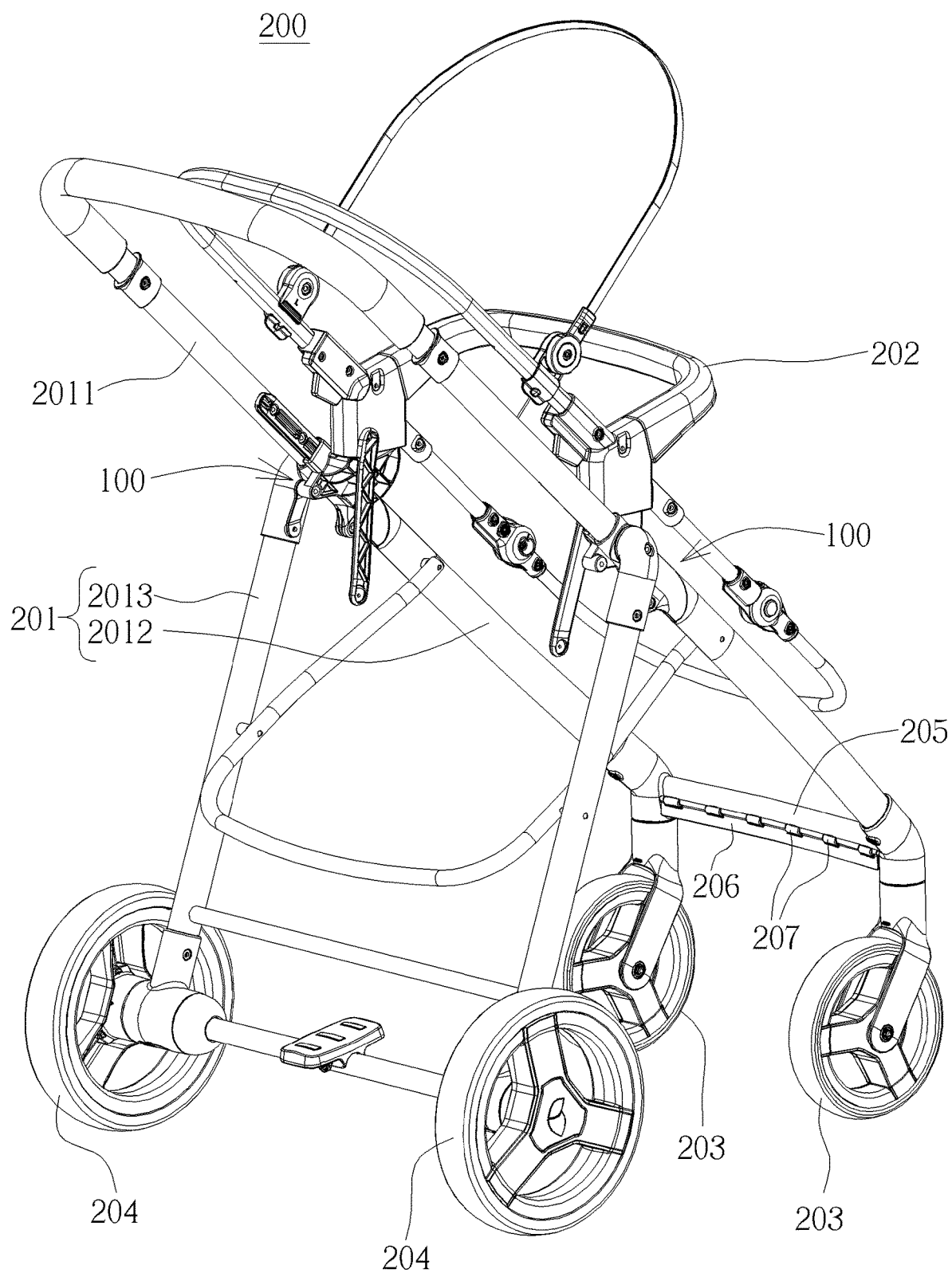

Please refer to FIG. 1 and FIG. 2. FIG. 1 and FIG. 2 are schematic diagrams of a child carrier 200 at different views according to an embodiment of the present invention. As shown in FIG. 1 and FIG. 2, the child carrier 200 of this embodiment can be a stroller. However, it is not limited thereto. The child carrier 200 includes two folding devices 100, a frame 201 and a seat 202. The two folding devices 100 are located at two sides of the frame 201 and installed between the seat 202 and the frame 201 and for detachably mounting the seat 202 on the frame 201. However, the number of the folding device 100 is not limited to this embodiment. For example, in another embodiment, the child carrier can include only one folding device located at one side of the frame.

The frame 201 includes a handle 2011, a front leg 2012 and a rear leg 2013. The front leg 2012 is pivotally connected to a lower end of the handle 2011 by the folding device 100. The rear leg 2013 is pivoted to an outer side of a middle portion the handle 2011 between the lower end of the handle 2011 and an upper end of the handle 2011. Furthermore, the child carrier 200 further includes two front wheels 203, two rear wheels 204, a basket, which is not shown in the figures, a pedal 205, a connecting component 206 and a plurality of fasteners 207. The front leg 2012 includes two front tubes 2012A. The rear leg 2013 includes two rear tubes 2013A. The two front wheels 203 are respectively rotatably disposed on two lower ends of the two front tubes 2012A of the front leg 2012. The two rear wheels 204 are respectively rotatably disposed on two lower ends of the two rear tubes 2013A of the rear leg 2013. The pedal 205 is disposed between the two front tubes 2012A. The plurality of fasteners 207 are disposed on the pedal 205 and arranged along the pedal 205 at intervals for detachably connecting the connecting component 206. The connecting component 206 is connected to the basket. In this embodiment, the plurality of fasteners 207 can be sleeved on or engaged with the pedal 205, and the connecting component 206 can be made of plastic material and sewed with the basket by stitching. Furthermore, the connecting component 206 can include a connecting end formed in a tube shape, and a cross-sectional shape of each of the plurality of fasteners 207 can match with a cross-sectional shape of the connecting end. Therefore, the basket can be installed on or detached from the pedal 205 firmly and easily by engagement or disengagement of the plurality of fasteners 207 and the connecting component 206.

However, it is not limited to this embodiment. For example, in another embodiment, the plurality of fasteners can be integrally formed with the pedal and extend from an outer periphery of the pedal. Alternatively, in another embodiment, the child carrier can include only one fastener.

Figure 3:
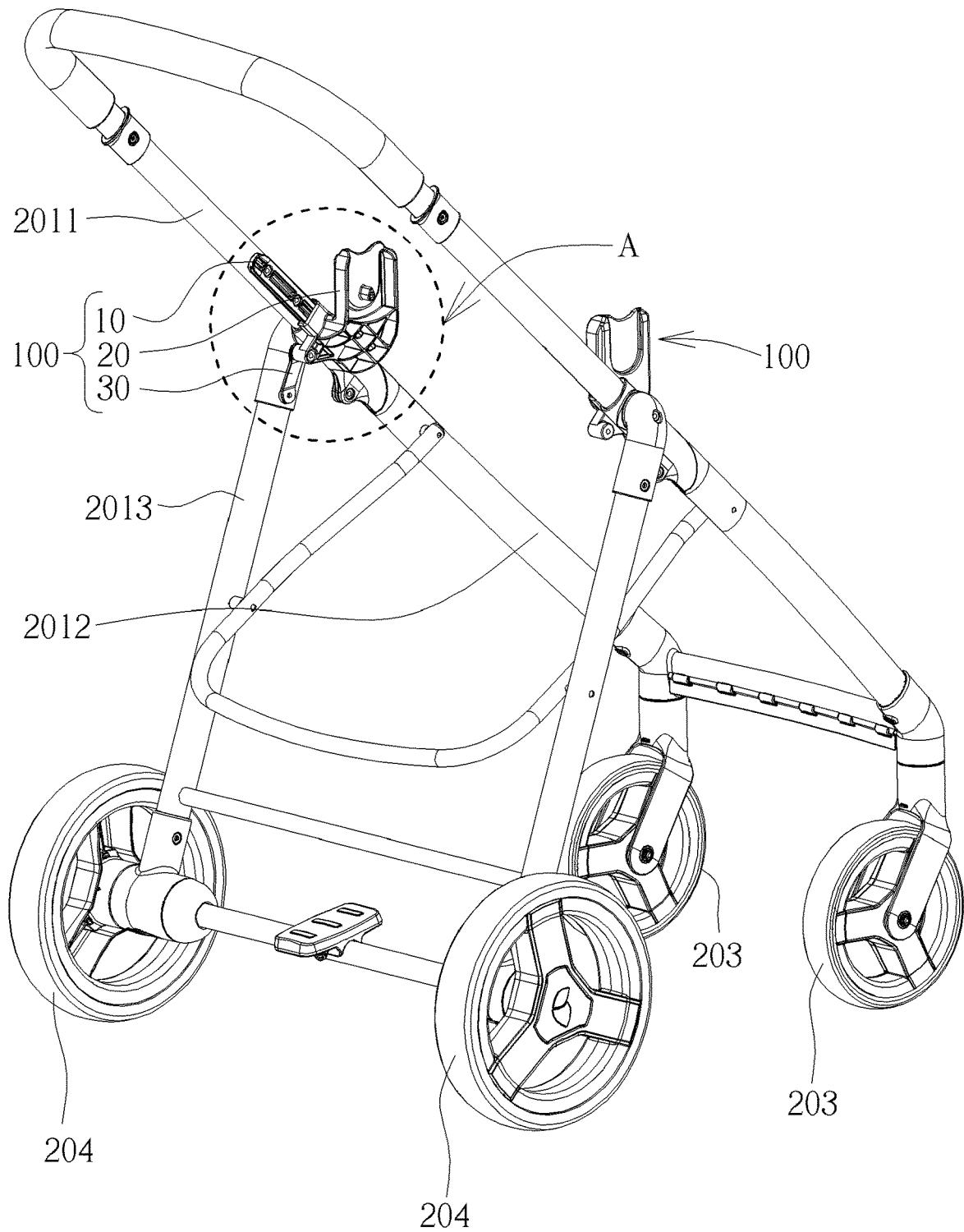
FIG. 3 is a partial diagram of the child carrier according to the embodiment of the present invention.
Figure 4:
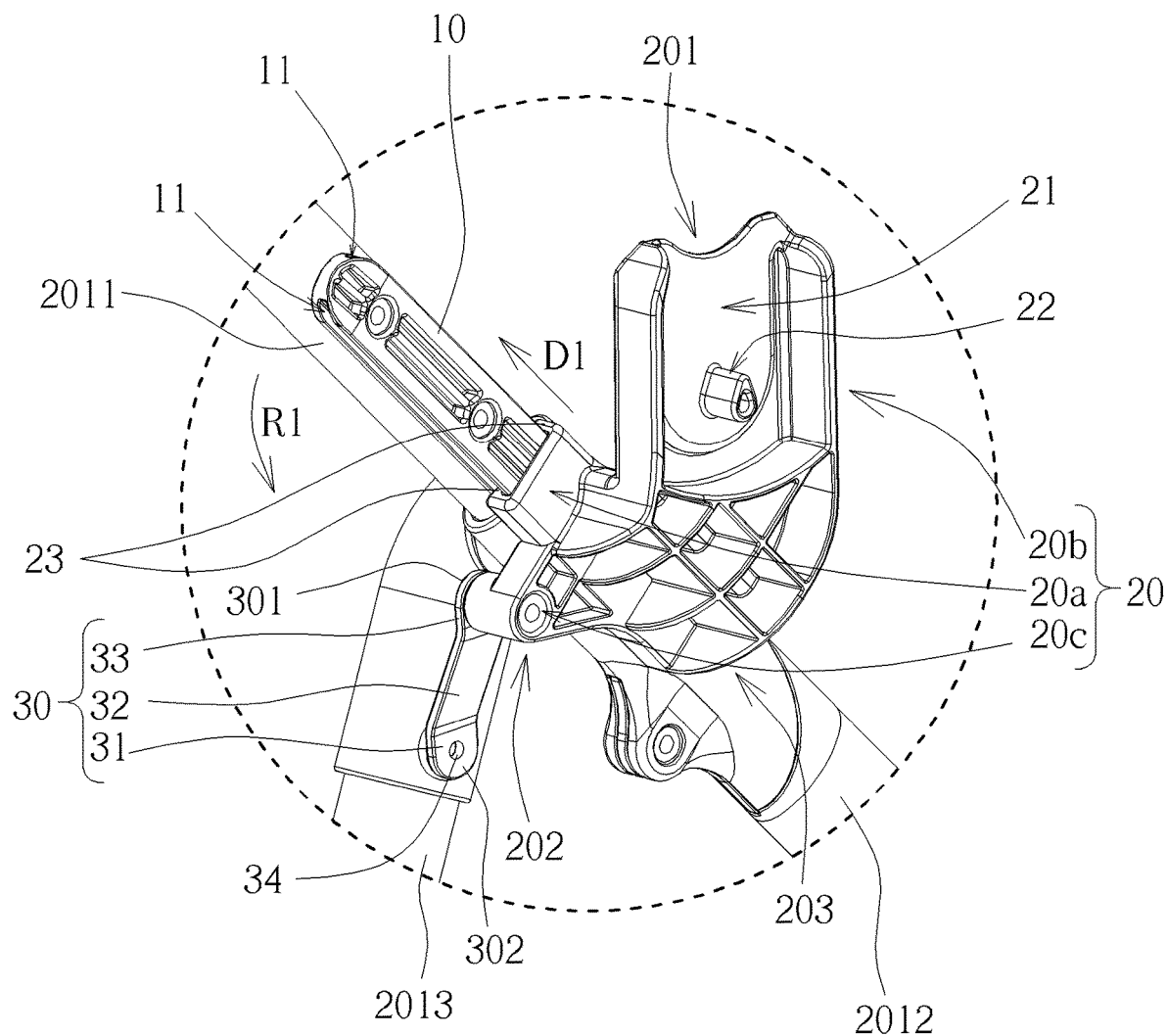
FIG. 4 is an enlarged diagram of an A portion of the child carrier shown in FIG. 3 according to the embodiment of the present invention.
Figure 5:
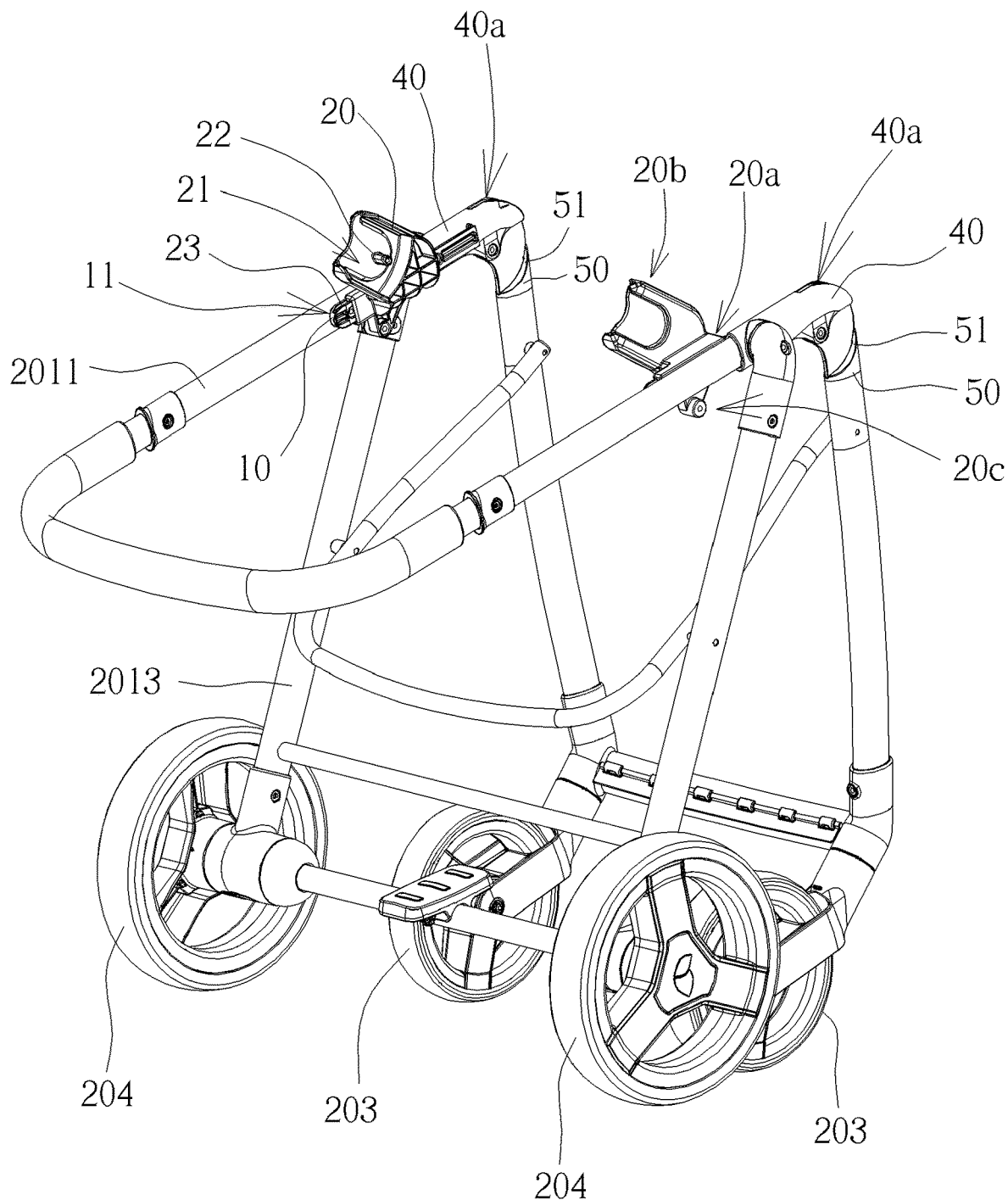
FIG. 5 is a partial diagram of the child carrier before completely folded according to the embodiment of the present invention.
Figure 6:
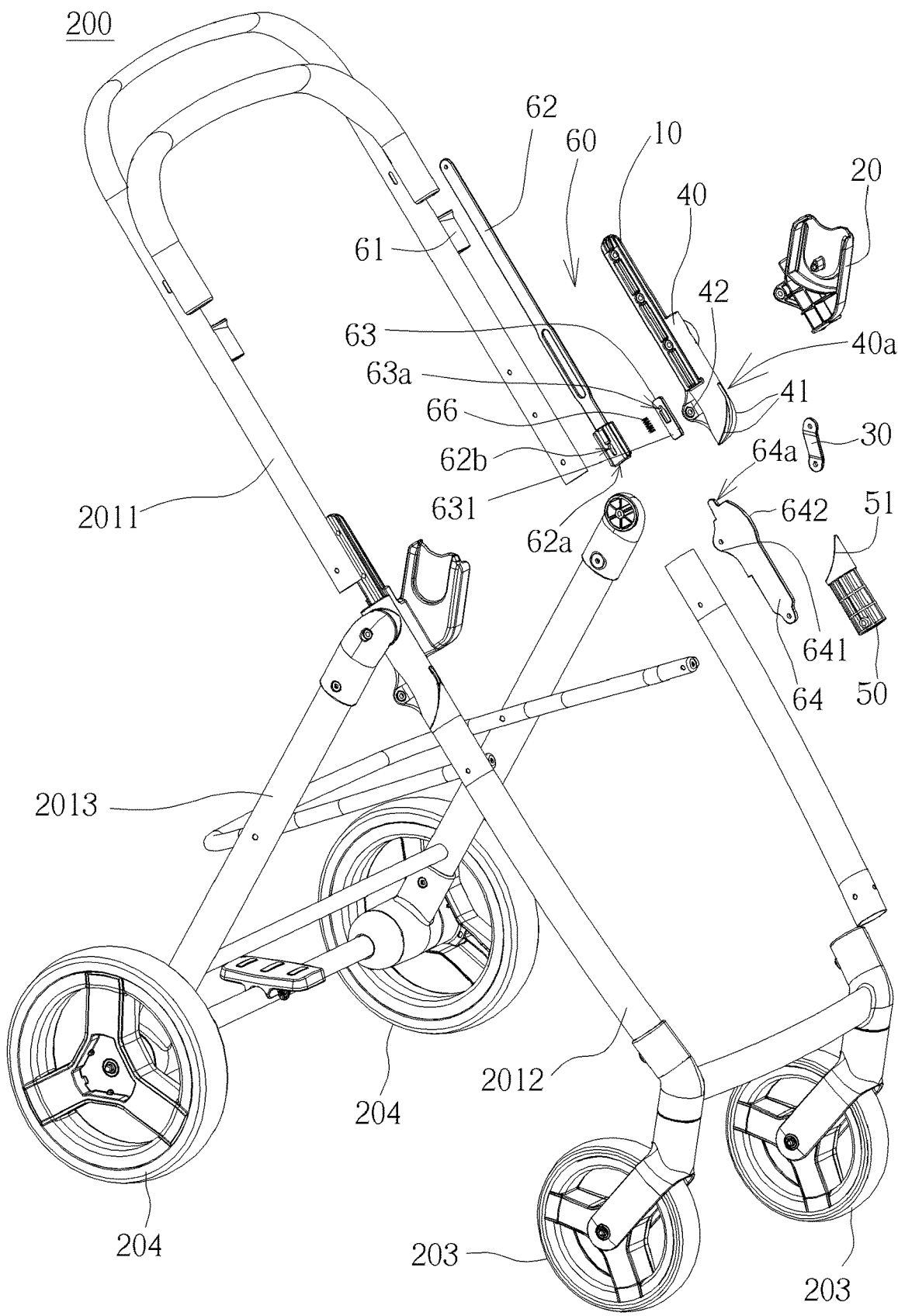
FIG. 6 is a partial exploded diagram of the child carrier according to the embodiment of the present invention.
Figure 7:
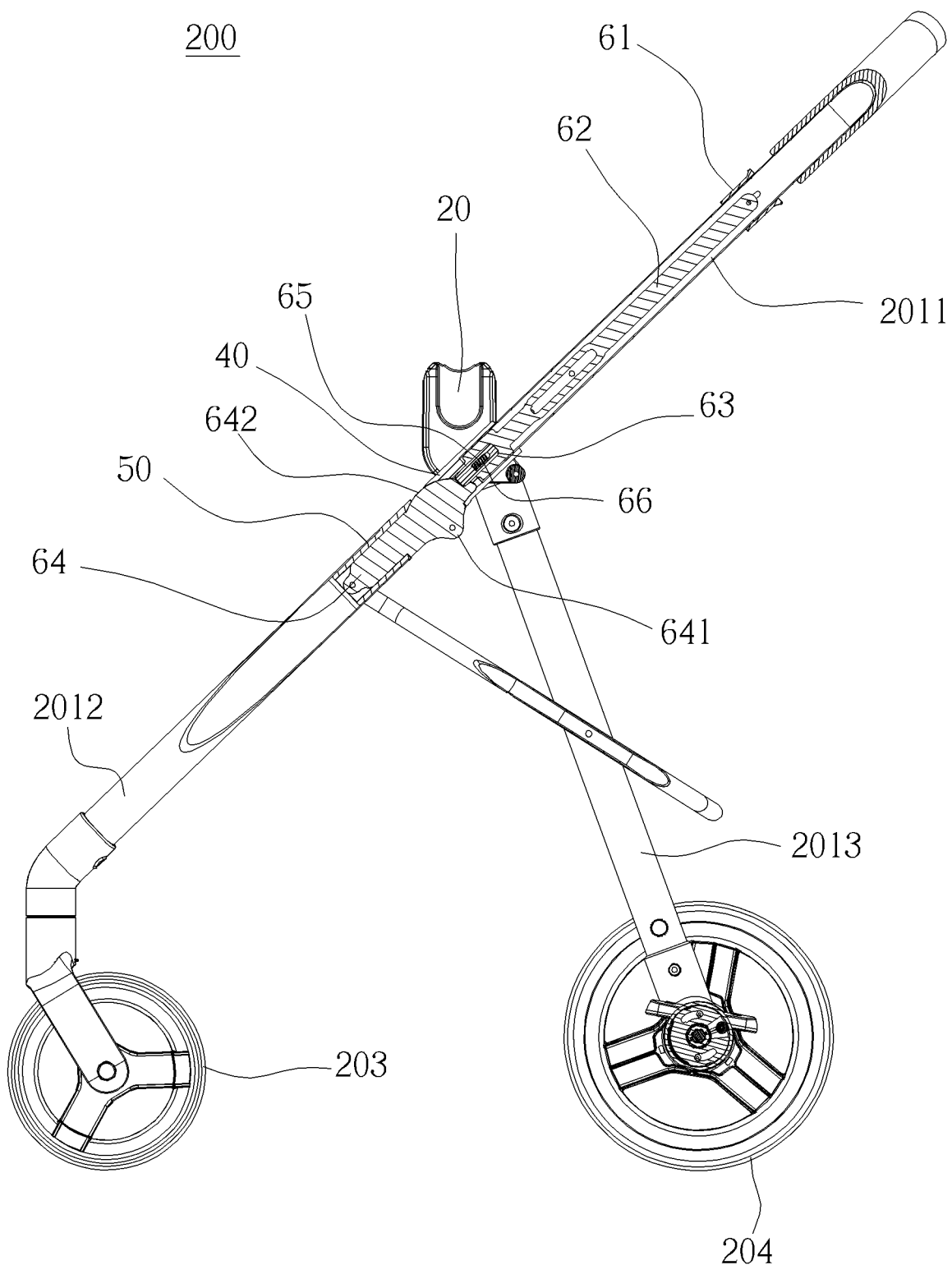
FIG. 7 is a sectional diagram of the child carrier according to the embodiment of the present invention.
Figure 8:
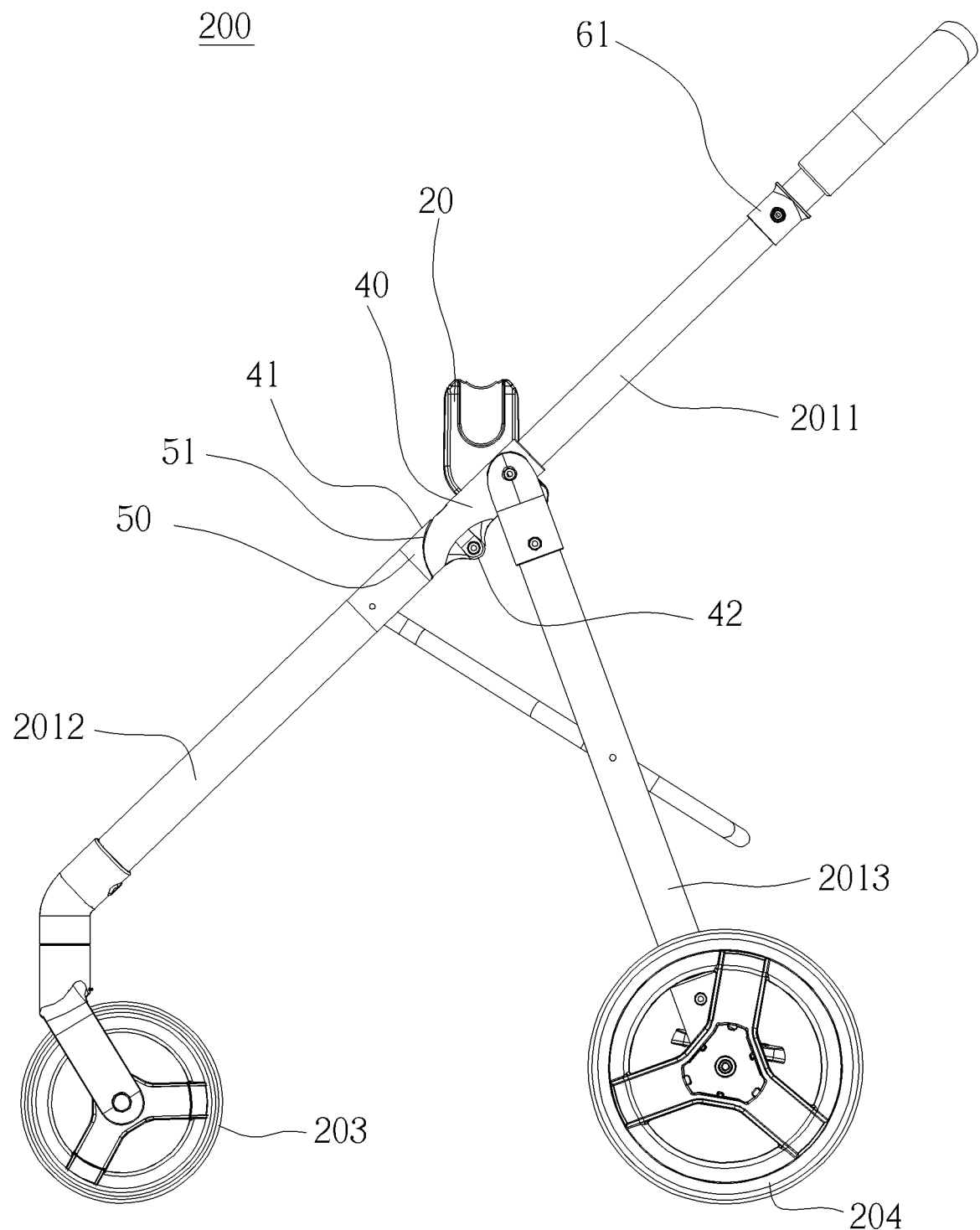
FIG. 8 to FIG. 10 are diagrams of the child carrier in different states according to the embodiment of the present invention.
Figure 9:
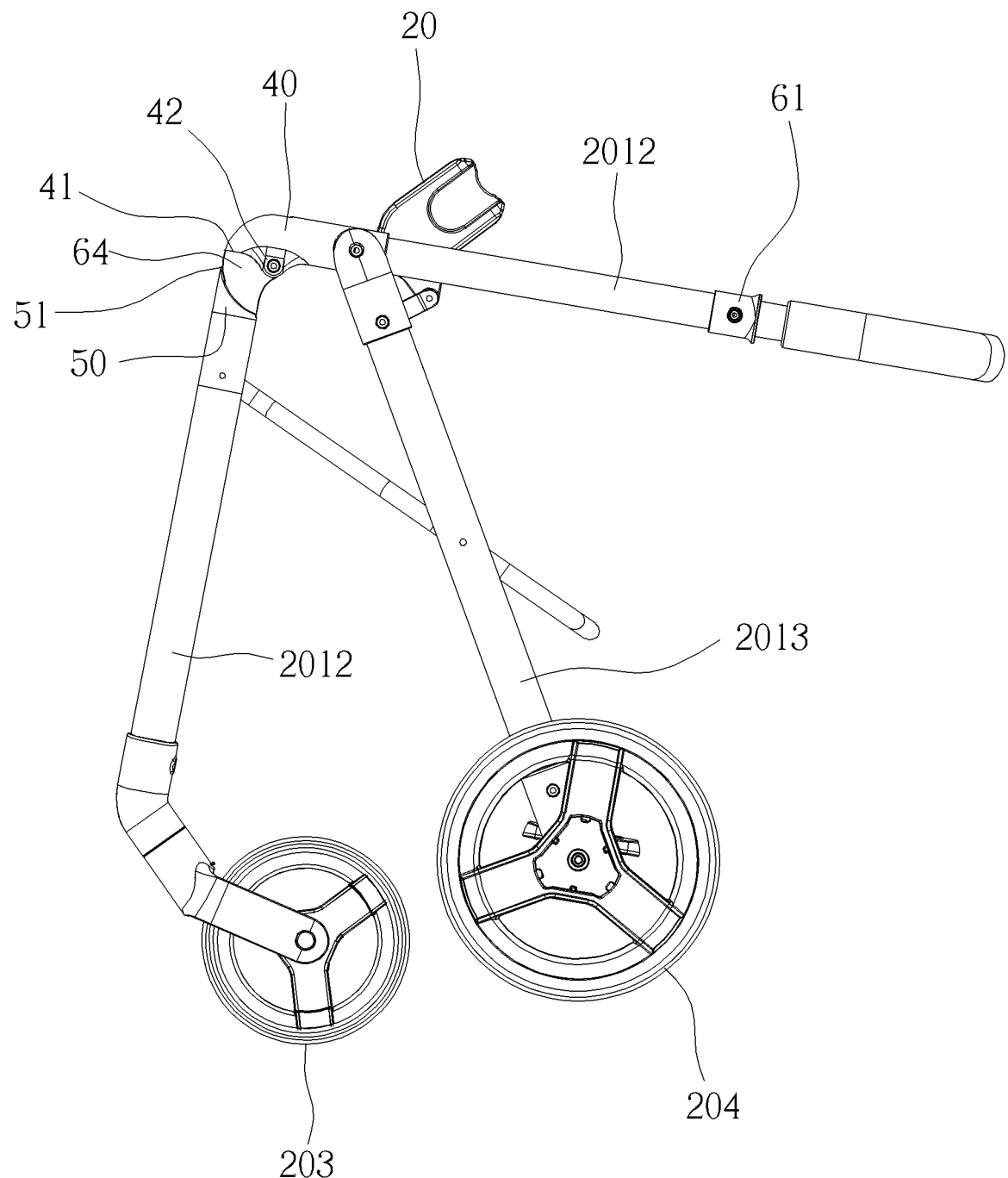
Figure 10:
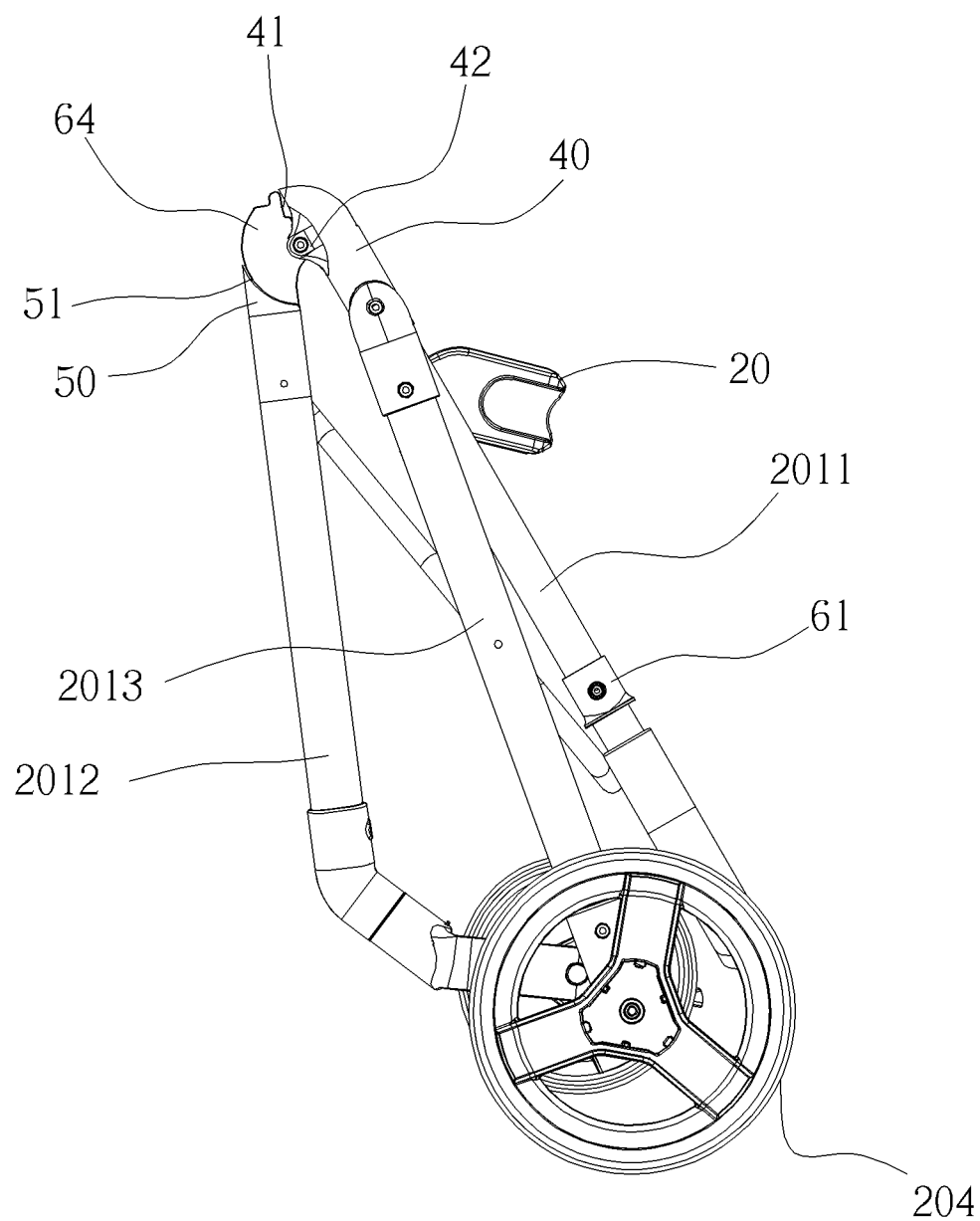

Please refer to FIG. 3 to FIG. 10. FIG. 3 is a partial diagram of the child carrier 200 according to the embodiment of the present invention. FIG. 4 is an enlarged diagram of an A portion of the child carrier 200 shown in FIG. 3 according to the embodiment of the present invention. FIG. 5 is a partial diagram of the child carrier 200 before being completely folded according to the embodiment of the present invention. FIG. 6 is a partial exploded diagram of the child carrier 200 according to the embodiment of the present invention. FIG. 7 is a sectional diagram of the child carrier 200 according to the embodiment of the present invention. FIG. 8 to FIG. 10 are diagrams of the child carrier 200 in different states according to the embodiment of the present invention. The two folding devices 100 have the same structure. For simplicity, detailed description of structure of the folding device 100 at one side is provided as follows.

As shown in FIG. 3 and FIG. 4, the folding device 100 includes a sliding structure 10, a mounting base 20 and a linking component 30. In this embodiment, the sliding structure 10 can be a sliding base fixedly disposed on the handle 2011 and arranged along a longitudinal direction of the handle 2011. However, it is not limited to this embodiment. For example, in another embodiment, the sliding structure can be a sliding slot structure disposed inside the handle 2011. The mounting base 20 is slidably disposed on the sliding structure 10 for detachably engaging with the seat 202. A first end 301 of the linking component 30 is pivotally connected to the mounting base 20, and a second end 302 of the linking component 30 is pivotally connected to the rear leg 2013. The linking component 30 is driven to drive the mounting base 20 to slide relative to the sliding structure 10 along the longitudinal direction of the handle 2011 to drive the seat 202 to slide relative to the handle 2011 toward the lower end or the upper end of the handle 2011 along the longitudinal direction of the handle 2011 when the handle 2011 pivots relative to the rear leg 2013. Specifically, when the handle 2011 pivots relative to the rear leg 2013 along a first pivoting direction R1 during a folding action of the child carrier 200, the linking component 30 is driven to drive the mounting base 20 to slide relative to the sliding structure 10 to drive the seat 202 to slide relative to the handle 2011 toward the upper end of the handle 2011 along a first sliding direction D1, which makes structure of the folded child carrier 200 compact for reducing an occupied space of the folded child carrier 200.

As shown in FIG. 4 and FIG. 5, the mounting base 20 includes a sliding portion 20a, a mounting portion 20b and a pivoting portion 20c. The sliding portion 20a is located between the mounting portion 20b and the pivoting portion 20c. The sliding portion 20a is slidably connected to the sliding structure 10. The mounting portion 20b is detachably for engaging with the seat 202, and the pivoting portion 20c is pivotally connected to the linking component 30.

Specifically, the mounting base 20 is formed in an L shape and includes an upper end part 20d, a lower end part 20e and a corner part 20f. Furthermore, the sliding portion 20a is located at the corner part 20f, and the mounting portion 20b and the pivoting portion 20c are respectively located on the upper end part 20d and the lower end part 20e. Besides, a mounting slot 21 is formed on a side of the mounting portion 20b away from the sliding portion 20a, and a positioning protrusion 22 is formed on the mounting slot 21. The mounting slot 21 is for accommodating a counter mounting portion of the seat 202, and a shape of the mounting slot 21 matches with a shape of the counter mounting portion of the seat 202. The positioning protrusion 22 is for positioning the counter mounting portion of the seat 202 when the counter mounting portion is accommodated in the mounting slot 21. The pivoting portion 20c is disposed on a side of the lower end part 20e of the mounting base 20 facing toward the rear leg 2013.

In addition, the linking component 30 includes a first segment 31, a second segment 32 and a third segment 33. The second segment 32 is located between and connected to the first segment 31 and the third segment 32. The first end 301 and the second end 302 of the linking component 30 are respectively located at the first segment 31 and the third segment 33 of the linking component 30. The first segment 31 and the third segment 33 are bent from the second segment 32 and toward two opposite directions for easily pivoting the first end 301 to the seat 202 and pivoting the second end 302 to the rear leg 2013. A connecting hole 34 is formed on each of the first end 301 and the second end 302.

As shown in FIG. 4 and FIG. 5, two first engaging portions 11 are respectively formed on two sides of the sliding structure 10 and symmetrical to each other, and two second engaging portions 23 are respectively formed on two sides of the sliding portion 20a and respectively corresponding to the two first engaging portions 11 for respectively slidably engaging with the two first engaging portions 11. Preferably, in this embodiment, the first engaging portion 11 can be a slot structure with a smooth and flat contacting surface, and the second engaging portion 23 can be a bar structure with a smooth and flat contacting surface, so that the mounting base 20 can be firmly and slidably connected to the sliding structure 10 by sliding engagement of the slot structure and the bar structure, which improves safety in use. However, it is not limited to this embodiment. For example, in another embodiment, there can be only one first engaging portion formed on one of the two sides of the sliding structure and one second engaging portion formed on the one of the two sides of the sliding portion 20a. Alternatively, in another embodiment, the first engaging portion can be a bar structure, and the second engaging portion can be a slot structure.

As shown in FIG. 5 and FIG. 6, the folding device 100 further includes a first fixing component 40 and a second fixing component 50. The first fixing component 40 and the second fixing component 50 are located between the handle 2011 and the front leg 2012 and seamlessly match with each other. Specifically, the first fixing component 40 is sleeved on an outer periphery of the handle 2011. The second fixing component 50 is partially disposed inside the front leg 2012, and an upper end of the second fixing component 50 protrudes out of the front leg 2012. Furthermore, the sliding structure 10 is fixedly disposed on the first fixing component 40. Besides, a first arc-shaped portion 41 is formed on a lower end of the first fixing component 40, and a second arc-shaped portion 51 is formed on the upper end of the second fixing component 50 and corresponding to the first arc-shaped portion 41. Preferably, in this embodiment, the first arc-shaped portion 41 can be a convex arc-shaped structure gradually protruding from top to bottom of the first fixing component 40, and the second arc-shaped portion 51 can be a concave arc-shaped structure gradually protruding from bottom to top of the second fixing component 50, so that the first fixing component 40 and the second fixing component 50 can be seamlessly match with each other by the first arc-shaped portion 41 and the second arc-shaped portion 51. However, it is not limited to this embodiment. For example, in another embodiment, the sliding structure also can extend from an upper end of the first fixing component and toward the upper end of the handle.

As shown in FIG. 6 and FIG. 7, the folding device 100 further includes a locking mechanism 60. The locking mechanism 60 is disposed between the handle 2011 and the front leg 2012 and for allowing or restraining pivotal movement of the handle 2011 relative to the front leg 2012. Specifically, the locking mechanism 60 includes an operating component 61, a driving component 62, a locking component 63 and an engaging component 64. The operating component 61 is movably disposed outside the handle 2011. The driving component 62 is disposed inside the handle 2011. The locking component 63 is disposed inside the handle 2011. The engaging component 64 is partially disposed inside the front leg 2012 and partially located between the first fixing component 40 and the second fixing component 50. An upper end of the driving component 62 is connected to the operating component 61 by a screwing member, which is not shown in the figures. The locking component 63 is movably connected to a lower end of the driving component 62 by a pin 65. The operating component 61 drives the driving component 62 to drive the locking component 63 to engage with or disengage from the engaging component 64 when the operating component 61 is operated.

Specifically, in this embodiment, an engaging notch 64a is formed on the engaging component 64, and an engaging protrusion 631 is formed on the locking component 63, so that the locking component 63 and the engaging component 64 can be engaged with or disengaged from each other by engagement or disengagement of the engaging notch 64a and the engaging protrusion 631. However, it is not limited to this embodiment. For example, in another embodiment, the engaging notch can be formed on the locking component, and the engaging protrusion can be formed on the engaging component.

Furthermore, an inserting slot 62a is formed on the lower end of the driving component 62. Two long holes 62b are formed on two sides of the lower end of the driving component 62 and communicated with the inserting slot 62a. A through hole 63a is formed on an upper end of the locking component 63. The upper end of the locking component 63 is inserted into the inserting slot 62a and movably connected to the driving component 62 by the pin 65 passing through the two long holes 62b and the through hole 63a. When the driving component 62 moves within the handle 2011, the driving component 62 drives the locking component 63 to engage with or disengage from the engaging component 64 by the pin 65, so as to restrain or allow the pivotal movement of the handle 2011 relative to the front leg 2012. Besides, the locking mechanism 60 further includes a resilient component 66 disposed between the locking component 63 and the pin 65 for biasing the locking component 63 to engage with the engaging component 64. Preferably, the resilient component 66 can be a compression spring.

In addition, an accommodating slot 40a is formed on the first fixing component 40. A first end of the engaging component 64 is disposed inside the second fixing component 50, and a second end of the engaging component 64 is at least partially disposed inside the accommodating slot 40a and detachable from the accommodating slot 40a. Specifically, the accommodating slot 40a is located at the lower end of the first fixing component 40 and penetrates into the first fixing component 40 from the first arc-shaped portion 41. Furthermore, a first pivoting part 42 is formed on the first fixing component 40 and located adjacent to the first arc-shaped portion 41. A second pivoting part 641 is formed on the engaging component 64 and located adjacent to the second arc-shaped portion 51. The first pivoting part 42 and the second pivoting part 641 are corresponding to each other and pivoted to each other by a pivoting shaft, which is not shown in the figures, so as to achieve a purpose of allowing the pivotal movement of the handle 2011 relative to the front leg 2012. Preferably, the engaging component 64 includes a protruding portion 642, and the protruding portion 642 is detached from the accommodating slot 40a when the handle 2011 pivots relative to the front leg 2012. The protruding portion 642 can be formed in an arc shape for preventing a user from being pinched to improve safety in use.

As shown in FIG. 3 to FIG. 10, operational principle of the folding device 100 is provided as follows.

When the child carrier 1 is in an unfolded state as shown in FIG. 8, the engaging component 64 is received in the accommodating slot 40a, and the engaging protrusion 631 on the locking component 63 engages with the engaging notch 64a on the engaging component 64, so that the pivotal movement of the handle 2011 relative to the front leg 2012 is restrained. When it is desired to switch the child carrier 1 from the unfolded state as shown in FIG. 8 to a folded state as shown in FIG. 10, the operating component 61 can be operated to drive the driving component 62 to drive the locking component 63 by the pin 65, so as to move the locking component 63 away from the engaging component 64 for disengaging the locking component 63 from the engaging component 64. During movement of the locking component 63 away from the engaging component 64, the resilient component 66 is compressed. When the locking component 63 is disengaged from the engaging component 64, the handle 2011 is allowed to pivot relative to the front leg 2012 along the first pivoting direction R1. During the pivotal movement of the handle 2011 relative to the front leg 2012 along the first pivoting direction R1, the handle 2011 can be operated to pivot relative to the rear leg 2013 along the first pivoting direction R1, so that the linking component 30 can be driven to drive the mounting base 20 to slide relative to the sliding structure 10, so as to drive the seat 202 to slide toward the upper end of the handle 2011 along the first sliding direction D1, which makes the structure of the folded child carrier 200 compact for reducing the occupied space of the folded child carrier 200. Furthermore, during the aforementioned pivotal movement of the handle 2012 relative to the front leg 2012 along the first pivoting direction R1, the protruding portion 642 is detached from and exposed out of the accommodating slot 40a. On the other hand, when it is desired to switch the child carrier 200 from the folded state as shown in FIG. 10 to the unfolded state as shown in FIG. 8, it can be achieved by pivoting the handle 2011 relative to the front leg 2012 and the rear leg 2013 along a pivoting direction opposite to the first pivoting direction R1. During the aforementioned process, the seat 202 can slide toward the lower end of the handle 2011 along a sliding direction opposite to the first sliding direction D1. After the handle 2011 pivots to an unfolded position as shown in FIG. 8, the locking component 63 can be recovered by the compressed resilient component 66 to engage with the engaging component 64. Detailed description of the unfolded operation is omitted herein for simplicity.

However, it is not limited to this embodiment. For example, in another embodiment, the handle can be pivoted to the front leg directly, and the first fixing component, the second fixing component and the locking mechanism can be omitted.

In contrast to the prior art, the preset invention utilizes the folding device installed between the seat and the frame to drive the seat to slide relative to the frame during a folding action or an unfolding action of the frame, which makes the structure of the folded child carrier compact to effectively reduce an occupied space of the folded child carrier for easy storage or transportation. Furthermore, the folding device and the child carrier of the present invention have advantages of simple structure and easy operation to provide a comfortable and safe sitting environment for a child.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A folding device installed between a frame and a seat of a child carrier, the folding device comprising:
   a sliding structure fixedly disposed on or inside a handle of the frame;
   a mounting base slidably disposed on the sliding structure for detachably engaging with the seat; and
   a linking component, a first end of the linking component being pivotally connected to the mounting base, a second end of the linking component being pivotally connected to a rear leg of the frame;
   wherein the linking component is driven to drive the mounting base to slide relative to the sliding structure when the handle pivots relative to the rear leg.

2. The folding device of claim 1, wherein the sliding structure is arranged along a longitudinal direction of the handle, and the mounting base is slidable along the longitudinal direction of the handle.

3. The folding device of claim 1, wherein the mounting base comprises a sliding portion, a mounting portion and a pivoting portion, the sliding portion is located between the mounting portion and the pivoting portion, the sliding portion is slidably connected to the sliding structure, the mounting portion is detachably for engaging with the seat, and the pivoting portion is pivotally connected to the linking component.

4. The folding device of claim 3, wherein the mounting base is formed in an L shape and comprises an upper end part, a lower end part and a corner part, the sliding portion is located at the corner part, and the mounting portion and the pivoting portion are respectively located on the upper end part and the lower end part.

5. The folding device of claim 3, wherein at least one first engaging portion is formed on the sliding structure, and at least one second engaging portion is formed on the sliding portion and for slidably engaging with the at least one first engaging portion.

6. The folding device of claim 3, wherein two first engaging portions are respectively formed on two sides of the sliding structure and symmetrical to each other, and two second engaging portions are respectively formed on two sides of the sliding portion and respectively corresponding to the two first engaging portions for respectively slidably engaging with the two first engaging portions.

7. The folding device of claim 3, wherein a mounting slot is formed on a side of the mounting portion away from the sliding portion for accommodating a counter mounting portion of the seat, a shape of the mounting slot matches with a shape of the counter mounting portion, and a positioning protrusion is formed on the mounting slot and for positioning the counter mounting portion of the seat when the counter mounting portion is accommodated in the mounting slot.

8. The folding device of claim 3, wherein the pivoting portion is disposed on a side of a lower end part of the mounting base facing toward the rear leg.

9. The folding device of claim 3, wherein the linking component comprises a first segment, a second segment and a third segment, the second segment is located between and connected to the first segment and the third segment, the first segment and the third segment are bent from the second segment and toward two opposite directions.

10. The folding device of claim 1, further comprising a first fixing component and a second fixing component for seamlessly matching with the first fixing component, and the first fixing component and the second fixing component are located between the handle and the front leg.

11. The folding device of claim 10, wherein the sliding structure is fixedly disposed on the first fixing component or extends from an upper end of the first fixing component and toward an upper end of the handle.

12. The folding device of claim 10, further comprising a locking mechanism disposed between the handle and the front leg and for allowing or restraining pivotal movement of the handle relative to the front leg.

13. The folding device of claim 12, wherein the locking mechanism comprises:
   an operating component movably disposed outside the handle;

a driving component disposed inside the handle, an upper end of the driving component being connected to the operating component;

a locking component disposed inside the handle and movably connected to a lower end of the driving component; and an engaging component partially disposed inside the front leg and partially located between the first fixing component and the second fixing component, the operating component driving the driving component to drive the locking component to engage with or disengage from the engaging component when the operating component is operated.

14. The folding device of claim 13, wherein an engaging notch is formed on one of the locking component and the engaging component, and an engaging protrusion is formed on another one of the locking component and the engaging component.

15. The folding device of claim 14, wherein an inserting slot is formed on the lower end of the driving component, two long holes are formed on two sides of the lower end of the driving component and communicated with the inserting slot, a through hole is formed on an upper end of the locking component, and the upper end of the locking component is inserted into the inserting slot and movably connected to the driving component by a pin passing through the two long holes and the through hole.

16. The folding device of claim 15, wherein the locking mechanism further comprises a resilient component disposed between the locking component and the pin for biasing the locking component to engage with the engaging component.

17. The folding device of claim 13, wherein an accommodating slot is formed on the first fixing component, a first end of the engaging component is disposed inside the second fixing component, and a second end of the engaging component is at least partially disposed inside the accommodating slot and detachable from the accommodating slot.

18. The folding device of claim 17, wherein the engaging component comprises a protruding portion formed in an arc shape, and the protruding portion is detached from the accommodating slot when the handle pivots relative to the front leg.

19. A child carrier comprising:
a frame comprising a handle and a rear leg pivoted to the handle;
a seat; and
at least one folding device installed between the seat and the frame and for detachably mounting the seat on the frame, the at least one folding device comprising:
a sliding structure fixedly disposed on or inside the handle;
a mounting base slidably disposed on the sliding structure for detachably engaging with the seat; and
a linking component, a first end of the linking component being pivotally connected the mounting base, a second end of the linking component being pivotally connected to the rear leg;
wherein the linking component is driven to drive the mounting base to slide relative to the sliding structure when the handle pivots relative to the rear leg.

20. The child carrier of claim 19, further comprising a pedal and a connecting component, the front leg comprising two front tubes, the pedal being disposed between the two front tubes, and the connecting component being detachably connected to the pedal for connecting a basket.

21. The child carrier of claim 20, further comprising at least one fastener disposed on the pedal and for detachably connecting the connecting component, the connecting component comprising a connecting end formed in a tube shape, and a cross-sectional shape of the at least one fastener matching with a cross-sectional shape of the connecting end.

22. The child carrier of claim 20, further comprising a plurality of fasteners disposed on the pedal and arranged along the pedal at intervals for detachably connecting the connecting component, the connecting component comprising a connecting end formed in a tube shape, and a cross-sectional shape of each of the plurality of fasteners matching with a cross-sectional shape of the connecting end.

* * * * *